(12) United States Patent
Okuyama et al.

(10) Patent No.: US 6,814,442 B2
(45) Date of Patent: Nov. 9, 2004

(54) IMAGE DISPLAY APPARATUS AND OPTICAL SYSTEM

(75) Inventors: Atsushi Okuyama, Saitama (JP); Junko Kuramochi, Kanagawa (JP); Takashi Sudo, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 09/842,124

(22) Filed: Apr. 26, 2001

(65) Prior Publication Data

US 2002/0018295 A1 Feb. 14, 2002

(30) Foreign Application Priority Data

Apr. 28, 2000 (JP) .................................. 2000-131485

(51) Int. Cl.⁷ .................. G03B 21/14; G03B 21/28; G02F 1/1335; G02B 12/14
(52) U.S. Cl. ..................... 353/20; 353/10; 353/33; 353/81; 349/11; 359/631
(58) Field of Search ............... 353/10, 20, 33, 353/81, 69, 102, 11, 112, 29, 94, 37; 349/11, 61, 64, 96; 359/571, 572, 631, 629, 728; 345/7; 362/257

(56) References Cited

U.S. PATENT DOCUMENTS

| RE27,356 E | 5/1972 | La Russa ................. 350/157 |
| 4,026,641 A | 5/1977 | Bosserman et al. ......... 350/298 |
| 4,081,209 A | 3/1978 | Heller et al. .............. 350/174 |

(List continued on next page.)

FOREIGN PATENT DOCUMENTS

| EP | 0 365 406 | 4/1990 | ........... G02B/27/00 |
| EP | 0 380 035 | 8/1990 | ........... G02B/27/00 |
| EP | 0 408 344 A2 | 1/1991 | ............ A42B/3/00 |
| EP | 0 556 598 A1 | 8/1993 | ............ G02B/7/34 |
| EP | 0 583 116 A2 | 2/1994 | ........... G02B/27/00 |
| EP | 0 618 471 A3 | 10/1994 | ........... G02B/27/00 |
| EP | 0 687 932 | 12/1995 | ........... G02B/27/00 |
| GB | 1 578 136 | 11/1980 | ......... G02B/27/107 |
| GB | 2 246 900 A | 2/1992 | ........... G09F/19/18 |
| JP | 58-78116 | 5/1983 | ........... G02B/27/02 |
| JP | 62-214782 | * 9/1987 | ............ H04N/5/64 |
| JP | 1-274736 | 11/1989 | ............ A61B/3/10 |
| JP | 1-274736 A | * 11/1989 | ............ A61B/3/10 |
| JP | 2-297516 A | * 12/1990 | ........... G02B/27/02 |
| JP | 2-297516 | 12/1990 | ........... G02B/27/02 |
| JP | 3-101709 | 4/1991 | ........... G02B/27/02 |
| JP | 3-109029 | * 5/1991 | ........... A61B/3/113 |

(List continued on next page.)

OTHER PUBLICATIONS

U.S. application 08/879,966, filed Jun. 20, 1997 (copy provided by applicant).*
U.S. application 08/959,285, filed Oct. 24, 1997 (copy provided by applicant).*
U.S. application 09/842,119, filed Apr. 26, 2001 (copy provided by applicant).*

(List continued on next page.)

*Primary Examiner*—David Gray
*Assistant Examiner*—Melissa J. Koval
(74) *Attorney, Agent, or Firm*—Fitzpatrick, Cella, Harper & Scinto

(57) ABSTRACT

An image display apparatus includes a light source for supplying illumination light, a reflection type display device which reflects the illumination light and modulates the illumination light into image light, and an illumination optical system for guiding the illumination light to the reflection type display device. The illumination optical system includes a first optical member for directing the illumination light toward the reflection type display device, and a second optical member. The second optical member includes a part generating a secondary light source with the illumination light emitted from the light source, in which the light from the part emerges toward the first optical member, and a reflecting surface which guides illumination light which is not incident directly on the part to the part. In addition, a projection optical system guides the image light to an observer.

20 Claims, 9 Drawing Sheets

U.S. PATENT DOCUMENTS

| | | | |
|---|---|---|---|
| 4,563,061 A | 1/1986 | Ellis | 350/503 |
| 4,669,810 A | 6/1987 | Wood | 350/3.7 |
| 4,775,217 A | 10/1988 | Ellis | 350/538 |
| 4,874,214 A | 10/1989 | Cheysson et al. | 350/3.7 |
| 4,969,724 A | 11/1990 | Ellis | 350/503 |
| 5,006,072 A | 4/1991 | Letovsky et al. | 434/61 |
| 5,093,567 A | 3/1992 | Staveley | 250/221 |
| 5,384,654 A | 1/1995 | Iba | 359/364 |
| 5,416,876 A | 5/1995 | Ansley et al. | 385/116 |
| 5,430,634 A | 7/1995 | Baker et al. | 362/32 |
| 5,436,763 A | 7/1995 | Chen et al. | 359/565 |
| 5,436,765 A | 7/1995 | Togino | 359/631 |
| 5,453,877 A | 9/1995 | Gerbe et al. | 359/633 |
| 5,459,612 A | 10/1995 | Ingleton | 359/630 |
| 5,479,224 A | 12/1995 | Yasugaki et al. | 353/101 |
| 5,483,307 A | 1/1996 | Anderson | 353/98 |
| 5,486,841 A | 1/1996 | Hara et al. | 345/8 |
| 5,486,892 A | 1/1996 | Suzuki et al. | 354/402 |
| 5,513,041 A | 4/1996 | Togino | 359/631 |
| 5,539,422 A | 7/1996 | Heacock et al. | 345/8 |
| 5,546,227 A | 8/1996 | Yasugaki et al. | 359/630 |
| 5,589,956 A | 12/1996 | Morishima et al. | 359/15 |
| 5,594,588 A | 1/1997 | Togino | 359/631 |
| 5,598,248 A | 1/1997 | Nagano et al. | 396/51 |
| 5,625,493 A | 4/1997 | Matsumura et al. | 359/630 |
| 5,640,632 A | 6/1997 | Koyama et al. | 396/382 |
| 5,671,062 A | 9/1997 | Nakamura | 359/687 |
| 5,701,202 A | 12/1997 | Takahashi | 359/631 |
| 5,734,505 A | 3/1998 | Togino et al. | 359/631 |
| 5,768,024 A | 6/1998 | Takahashi | 359/633 |
| 5,836,667 A | 11/1998 | Baker et al. | 362/32 |
| 5,875,056 A | 2/1999 | Takahashi | 359/633 |
| 6,014,524 A | 1/2000 | Suzuki et al. | 396/50 |
| 6,018,423 A | 1/2000 | Takahashi | 359/633 |
| 6,094,241 A * | 7/2000 | Yamazaki | 349/11 |
| 6,139,157 A | 10/2000 | Okuyuma | 353/102 |
| 6,195,207 B1 | 2/2001 | Takahashi | 359/637 |
| 6,257,726 B1 | 7/2001 | Okuyama | 353/20 |
| 6,292,297 B1 * | 9/2001 | Danziger et al. | 359/575 |
| 6,369,948 B2 * | 4/2002 | Danziger et al. | 359/575 |
| 6,396,639 B1 * | 5/2002 | Togino et al. | 359/630 |
| 6,445,507 B2 * | 9/2002 | Togino et al. | 359/637 |
| 6,480,337 B2 | 11/2002 | Inoguchi et al. | 359/630 |
| 6,490,095 B2 | 12/2002 | Okuyama et al. | 359/631 |
| 2002/0018185 A1 * | 2/2002 | Kuramochi et al. | 353/69 |
| 2002/0021498 A1 * | 2/2002 | Ohtaka et al. | 359/629 |

FOREIGN PATENT DOCUMENTS

| | | | |
|---|---|---|---|
| JP | 4-242630 | 8/1992 | A61B/3/14 |
| JP | 4-343313 | 11/1992 | G02B/15/16 |
| JP | 5-303056 | 11/1993 | G02B/27/02 |
| JP | 6-250120 | 9/1994 | G02B/27/18 |
| JP | 7-294922 | 11/1995 | G02F/1/1335 |
| JP | 7-333551 | 12/1995 | G02B/27/02 |
| JP | 8-160340 | 6/1996 | G02B/27/02 |
| JP | 11-125791 * | 5/1999 | G02B/27/02 |

OTHER PUBLICATIONS

U.S. application 09/842,057, filed Apr. 26, 2001 (copy provided by applicant).*

U.S. application 09/222,775, filed Dec. 30, 1998 (copy provided by applicant).*

U.S. application 09/812,698, filed Mar. 21, 2001 (copy provided by applicant).*

U.S. application 09/659,686, filed Sep. 11, 2000 (copy provided by applicant).*

U.S. application 09/025,856, filed Feb. 19, 1998 (copy provided by applicant).*

U.S. application 09/848,272, filed May 4, 2001 (copy filed by applicant).*

* cited by examiner

IMAGE DISPLAY APPARATUS AND OPTICAL SYSTEM

BACKGROUND OF THE INVENTION

1. Field of the Invention

The present invention relates to an image display apparatus that is a so-called head mounted display or the like.

2. Related Background Art

For image display apparatuses such as head mounted displays, various types of optical systems have been proposed for miniaturizing each whole apparatus. For example, Japanese Patent Application Laid-Open No. 7-333551 (corresponding to EP 687932A3) discloses an apparatus in which a prism-like optical element consisting of rotationally asymmetrical first, second, and third surfaces is used to display an image on a display surface of an image display element as an enlarged image via the first, second, and third surfaces of the optical element.

Such a prism-like optical element makes it possible to correct image distortion, curvature of field, and astigmatism with a very compact, simple arrangement, and satisfy the telecentric condition with respect to the display surface.

Although transmissive liquid crystal displays were common as image display apparatuses at the time of the proposal in this reference the transmissive liquid crystal display has drawbacks that it is difficult to make the increase of pixels be compatible with miniaturization since the pixel apertures in the transmissive liquid crystal display are small. Recently, since high-resolution image output apparatuses such as personal computers, and DVDs besides moving image apparatuses such as VTRs, and TV sets have increased, high-resolution image display is desired.

Corresponding to such a current status, it is possible to obtain a high-resolution image by using a reflective liquid crystal display whose pixel apertures can be made to be large while attaining the increase of their pixels and miniaturization. An apparatus using a reflective liquid crystal display is disclosed, for example, in Japanese Patent Application Laid-Open No. 11-125791. This reference, as shown in FIG. 15, discloses a display apparatus in which a reflective liquid crystal display 103 is directly illuminated with illumination light 102 from a light source 101 without mediacy of an optical element and an image on the liquid crystal display is guided to an observer's eye 105 to be displayed as an enlarged virtual image by a prism-like display optical element 104.

However, in this display apparatus, since the liquid crystal display 103 is directly illuminated with the illumination light 102 from the light source 101, an angle θ of the illumination light 102 and a normal of the liquid crystal display 103 becomes large.

For this reason, since the whole display apparatus becomes large and the liquid crystal display 103 is greatly inclined relative to the display optical element 104, a distance between the liquid crystal display 103 and the display optical element 104 changes depending on places, and there is a problem that optical characteristics degrade.

Moreover, another display apparatus disclosed by Japanese Patent Application Laid-Open No. 11-125791 has a configuration that, as shown in FIG. 16, a light source 101 is provided on the opposite side of the reflective liquid crystal display 103 with respect to the prism-like display optical element 104, the liquid crystal display 103 is illuminated with the illumination light 102 from the light source 104 and reflected by the liquid crystal display 103, and the reflected light from the display is adapted to enter an observer's eye 105 through the inside of the display optical element 104 again.

However, since the utilization efficiency of the illumination light is not taken into account in such a conventional illumination system and some amount of light emitted from the light source is not used as illumination light, the illumination systems shown by these conventional examples are very inefficient.

SUMMARY OF THE INVENTION

An object of the present invention is to provide an image display apparatus using a reflection type display device corresponding to high-resolution images such as a personal computer output, and having high utilization efficiency of illumination light though it has very simple and compact configuration.

In order to attain the above-described object, an image display apparatus according to one embodiment of the present invention comprises a light source which supplies illumination light, a reflection type display device which reflects the illumination light and modulates the illumination light into image light, an illumination optical system which guides the illumination light to the reflection type display device, and a projection optical system which guides the image light to an observer. The image display apparatus is characterized in that the illumination optical system comprises a first optical member that directs the illumination light toward the reflection type display device, and a second optical member that directs the illumination light toward the first optical member.

Moreover, an optical system according to another embodiment of the present invention has an illumination optical system that guides illumination light toward a reflection type display device, and a projection optical system that guides the image light, reflected by the reflection type display device, to an observer. The optical system is characterized in that the illumination optical system comprises a first optical member that directs illumination light toward a reflection type display device, and a second optical member that directs the illumination light toward the first optical member.

Moreover, an image display apparatus and an optical system according to an embodiment of the present invention are characterized in that, in particular, a second optical member satisfies at least one of: (a) a condition that the second optical member comprises a secondary light source generating part which generates a secondary light source with illumination light emitted from a light source, and a reflecting surface which guides illumination light other than the illumination light directly incident on the secondary light source generating part among the illumination light from the light source, to the secondary light source generating part, and emits the illumination light from the secondary light source to the first optical member; and (b) a condition that the second optical member comprises a reflecting surface which deflects a principal optical path of the illumination light from the light source, and emits the illumination light, reflected by the reflecting surface, to the first optical member.

DETAILED DESCRIPTION OF THE PREFERRED EMBODIMENTS

Embodiment 1

Figure 1:
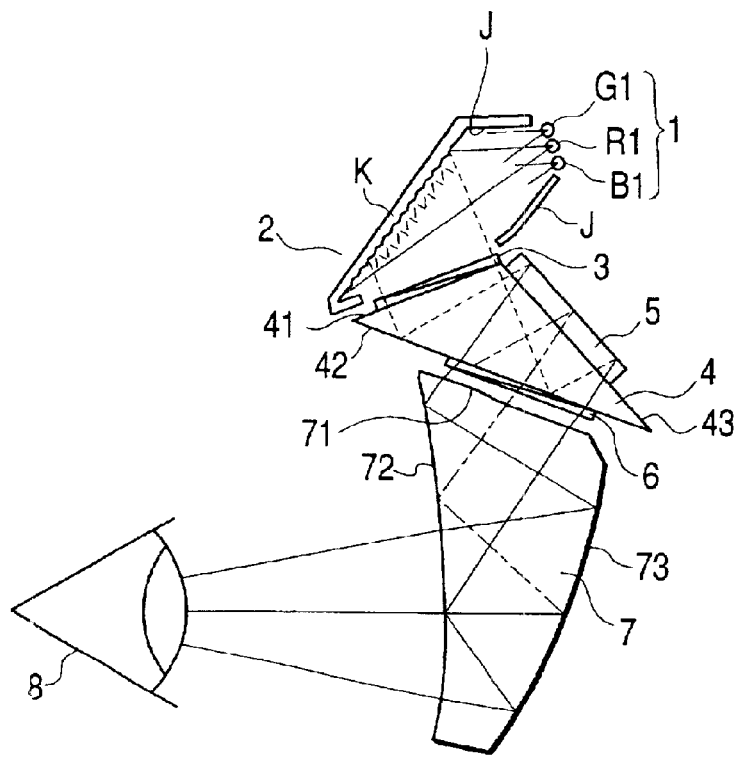
FIG. 1 is a structural diagram showing an image display apparatus that is a first embodiment of the present invention.

FIG. 1 shows an image display apparatus that is a first embodiment of the present invention. The image display apparatus of this embodiment is suitable for a head-mounted display with which an observer's head is equipped. In this figure, a light source 1 consists of light emitting diodes (LEDs) and the like, and has emitting parts R1, G1, and B1 which emit color light of R (red), G (green), and B (blue) respectively. A reflecting case (a second light guide device (optical member)) 2 is hollow.

Reference numeral 3 denotes a first polarizing plate and reference numeral 4 is an illuminating prism (a first light guide device (optical member)). Reference numeral 5 is a reflective liquid crystal display panel (a reflective image display device: hereinafter, this is simply called a display panel), and reference numeral 6 is a second polarizing plate. Reference numeral 7 is a prism lens (a projection optical element), and reference numeral 8 is an observer's eye. An illumination optical system for illuminating the display panel 5 comprises the reflecting case 2 and illuminating prism 4, and a projection optical system for guiding to an observer the image light reflected by the display panel 5 comprises the prism lens 7.

Figure 2:
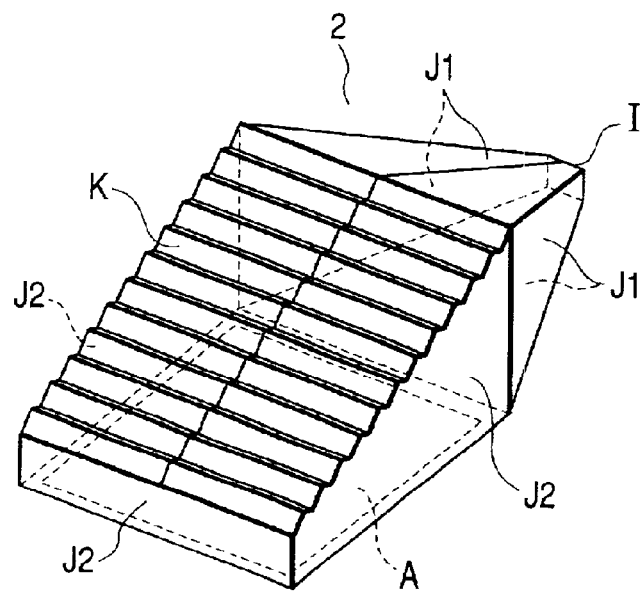
FIG. 2 is a perspective view of a reflecting case used for the image display apparatus of the above-described first embodiment.

Here, FIG. 2 is a perspective view of the reflecting case 2. The reflecting cases 2, as shown in FIG. 2, is so structured to include an incident aperture I, four reflecting surfaces J1 that is aslant arranged so that it may spread vertically and horizontally toward a back side of the case from this incidence aperture I, a diffusing surface (a secondary light source generating surface) K which is aslant arranged so as to obliquely face the incident aperture I in an upper part of the back side of the case, three reflecting surfaces J2 that are arranged so as to surround the right and left sides of the back side and a deepest back side of the case, and an exit aperture A that is formed in a part facing the diffusing surface K in a lower part of the back side of the case. A light source 1 is so disposed as to be adjacent to the incident aperture I, and the light emitted from the light source 1 is covered and surrounded by the reflecting case 2.

Moreover, the illuminating prism 4 is arranged between the prism lens 7 and display panel 5, and a surface (reflecting and transmitting surface) 42 of the illuminating prism 4 at the prism lens side and a surface 43 at the display panel side (transmitting surface) are configured at a predetermined angle.

Furthermore, the first polarizing plate 3 is fixed to a surface 41 of the illuminating prism 4 and the display panel 5 is fixed to a surface 43 of the illuminating prism 4 with an adhesive. Moreover, the second polarizing plate 6 is fixed to a surface 42 of the illuminating prism 4 through a supporting member (not shown). In addition, the light source 1, the reflecting case 2, and the illuminating prism 4 are integrally secured in one piece through a supporting member not shown. Thereby, positioning of the illumination optical system and the display panel 5 with respect to the prism lens 7 can be performed in one piece.

Thus, in the image display apparatus configured like this, divergent light (illumination light) emitted from the light source 1 enters into the reflecting case 2 through the incident aperture I. The divergent light entering into the reflecting case 2 is directly incident on the diffusing surface K, or is incident on the diffusing surface K after being reflected by the reflecting surfaces J1. The illumination light incident on the diffusing surface K is reflected irregularly and diffused in this diffusing surface K, and generates a substantial secondary light source here. That is, both of a component directly entering into the diffusing surface K among the illumination light emitted from the light source 1, and another component being reflected by the reflecting surfaces J1 and entering into the diffusing surface K are used effectively, and a secondary light source is thus generated.

In addition, the illumination light from this secondary light source passes through the exit aperture A, while a part of the illumination light is reflected by the reflecting surfaces J2, and emerges from the reflecting case 2.

Figure 3:
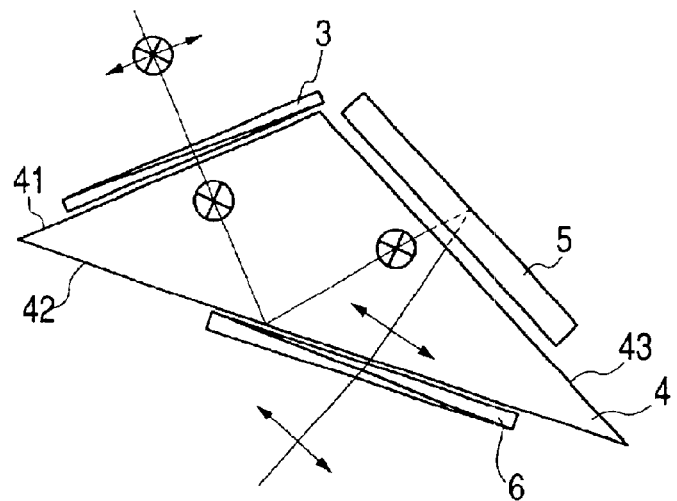
FIG. 3 is an explanatory diagram of a polarization condition in the image display apparatus according to the above-described first embodiment.

As shown in FIG. 3, the illumination light emerging from the reflecting case 2 passes through the first polarizing plate 3, is transformed into S-polarized light, transmits through the incident surface 41 of the illuminating prism 4, and enters into the illuminating prism 4. In addition, a circled X mark indicated on an optical axis line in FIG. 3 denotes that the light in this portion is S-polarized light, and an arrow denotes that the light in this portion is P-polarized light. Both of S-polarized light and P-polarized light are contained in the illumination light before entering into the first polarizing plate 3, and the light becomes only S-polarized light by transmitting through the first polarizing plate 3.

The S-polarized light entering into the illuminating prism 4 is totally reflected by the reflecting and transmitting surface 42 of the illuminating prism 4, transmits through the transmitting surface 43 hear the display panel 5 or integrally provided thereto, and illuminates the display panel 5.

In the display panel 5, according to a video signal supplied from an image information output unit such as a personal computer and a DVD player, which are not shown, the polarized direction of light is modulated by 90° to emerge as P-polarized light. Furthermore, P-polarized light (image light) that is reflected and emerged from the display panel 5 transmits through the transmitting surface 43 again, enters into the illuminating prism 4, transmits through the reflecting and transmitting surface 42, and enters into the second polarizing plate 6.

The second polarizing plate 6 has characteristics that it makes light composed of P-polarized component transmit and absorbs light composed of S-polarized component perpendicular to the P-polarized direction, and hence, owing to this, the image light which is the P-polarized light is analyzed.

After transmitting through the second polarizing plate 6, the image light transmits through a first surface 71 of the prism lens 7, and is reflected on second and third surfaces 72 and 73 thereafter to transmit through the second surface 72 and reaches the observer's eye 8. At this time, the prism lens 7 has a positively refractive-power to make an image, displayed on the display panel 5, be a virtual image under magnification. Since three surfaces 71–73 which configure the prism lens 7 are formed by each rotationally asymmetrical curved surface, it is possible to observe a good image by sufficiently correcting various image aberrations (distortion etc.).

In addition, in this embodiment, a control circuit is provided, the control circuit which switches the emission of the emitting parts R1, G1, and B1 of the light source 1 sequentially and controls the display panel 5 to display each color image corresponding to each emitted color synchronizing with this emission switch (so-called field sequential control). Thereby, a high-definition full color image without pixel discrepancy is observable.

Thus, a bright display image can be obtained in this embodiment without increasing the emitting amount of the light source 1, since a secondary light source is generated to illuminate the display panel 5 with effectively using the illumination light from the light source 1 by means of the reflecting case 2.

Further, since the principal optical path of the illumination light from the light source 1 is bent by the diffusing surface (and also reflecting surface) K of the reflecting case 2, while being able to attain the miniaturization of the illumination optical system and also the whole apparatus, the allocation flexibility of the light source 1 can be also enhanced.

Moreover, since illumination light and image light pass along the same area between the reflecting and transmitting surface 42 and the transmitting surface 43 of the illuminating prism 4, it is possible to perform the illumination of a display panel 5 and the light guide of the image light to the prism lens 7 by a small optical system. Thereby, it is possible to attain the miniaturization of the illumination optical system and the whole image display apparatus as a result.

In addition, in this embodiment, an antireflection film may be attached to each surface other then the reflecting surface in the illuminating prism 4 or the prism lens 7 so that the generation of a flare or a ghost may be prevented by preventing the unnecessary reflection of light.

By the way, although polarizing plates 3 and 6 are used in this embodiment, when outdoor daylight (for example, sunlight) enters from the side of the observer's eye 8 at the idle time etc. of the apparatus, condensing points are made near the polarizing plates 3 and 6 by an optical action of the prism lens 7, and there is a possibility that the polarizing plates 3 and 6 may deteriorate. In order to prevent the deterioration, it is preferable to arrange the polarizing plates 3 and 6 in positions where the polarizing plates 3 and 6 are separated from the display panel 5 (for example, a position where the intensity I1 of the outdoor daylight on the polarizing plate becomes 1/10 or less of the intensity IO of that on the display panel 5).

Moreover, in this embodiment, in order to prevent that light other than the illumination light from the secondary light source enters into the illuminating prism 4, and reaches the observer's eye 8, it can be performed lest unnecessary light should enter into an eye by painting black paint having optical-absorption nature by making surfaces, other than optically active surfaces such as a side of the illuminating prism 4, into the diffusing surfaces.

Figure 4:
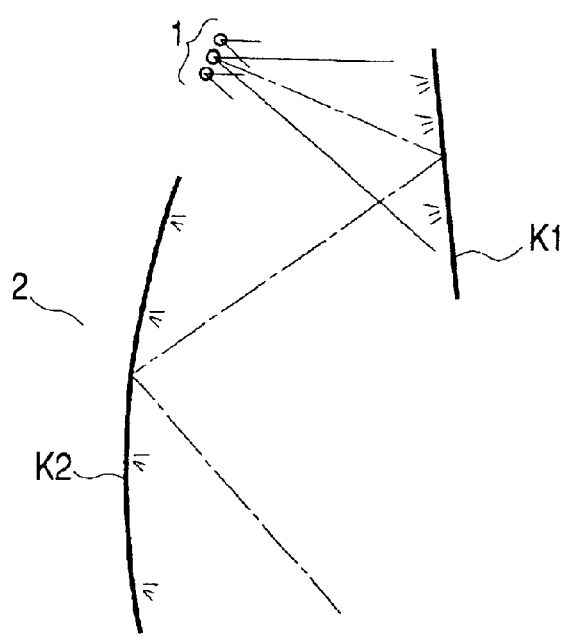
FIG. 4 is an explanatory diagram showing a modified example of the image display apparatus according to the above-described first embodiment.

Furthermore, instead of the above-described reflecting case 2, as shown in FIG. 4, it can be also performed to provide a second light guide device composed of a plurality of diffusing surfaces K1 and K2. In this case, it can be also performed to make it possible to efficiently use light from a light source 1 by providing curvature for each diffusing surface.

Moreover, in this embodiment, the first polarizing plate 3 is fixed to the surface 41 of the illuminating prism 4, the second polarizing plate 6 is fixed to the surface 42, and the panel 5 is fixed to the surface 43 with an adhesive. Hence, it is possible to perform positioning to the prism lens 7 in one piece since the light source 1, the reflecting case 2, and the illuminating prism 4 are secured in one piece through the supporting member not shown.

In addition, in this embodiment, the explanation is made to the case where the illumination light transmitting through the first polarizing plate 3 is S-polarized light and the image light modulated by the display panel 5 is P-polarized light. Nevertheless, the illumination light transmitting through the first polarizing plate 3 can be P-polarized light, and the image light modulated by the panel 5 does not need to be P or S-polarized light but can be polarized light in any direction.

Embodiment 2

Figure 5:
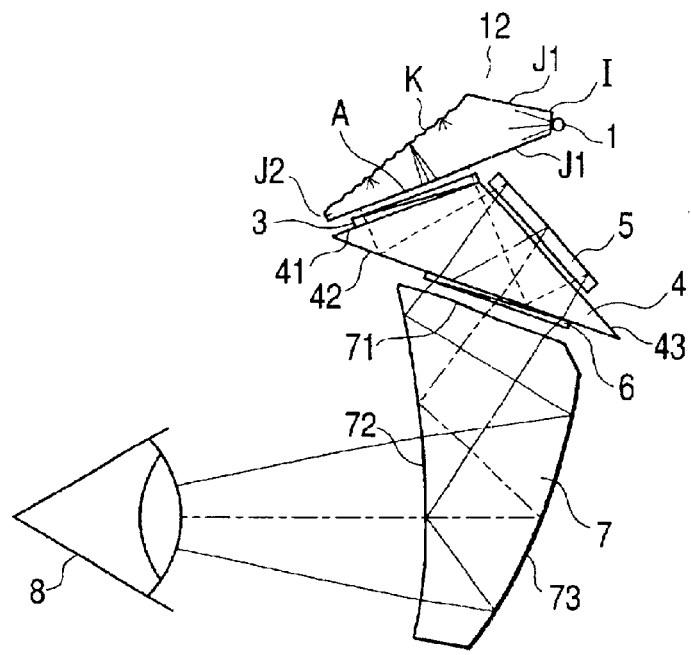
FIG. 5 is a structural diagram of an image display apparatus that is a second embodiment of the present invention.

FIG. 5 shows an image display apparatus that is a second embodiment of the present invention. In addition, the same reference numerals are assigned to components similar to those in the first embodiment.

In this embodiment, instead of the reflecting case 2 in the first embodiment, a diffusing prism (a second light guide device) 12 is used.

The diffusing prism 12 is formed in a prism-like shape of being filled with a medium having a refractive index larger than one. In addition, its entire shape is similar to the reflecting case 2 in the first embodiment. Namely, the diffusing prism 12 comprises an incident surface I near which a light source 1 is disposed, four reflecting surfaces J1 aslant arranged so that it may spread vertically and horizontally toward a back side of the prism from this incident surface I, the diffusing surface K (secondary light source generating surface) that is aslant arranged so that the diffusing surface K may aslant face the incident surface I in an upper back side of the prism, three reflecting surfaces J2 arranged so that the surfaces J2 may surround the right and left sides of the back side and the deepest back side of the prism, and the exit surface A formed in a portion which faces the diffusing surface K in a lower back side of the prism.

In addition, in FIG. 5, the three emitting parts R1, G1, and B1 of the light source 1 are arranged in the direction perpendicular to the drawing sheet.

In this embodiment, divergent light (illumination light) emitted from the light source 1 enters into the diffusing prism 12 through the incident surface I. The divergent light entering into the diffusing prism 12 directly enters into the diffusing surface K, or enters into the diffusing surface K after being reflected by the reflecting surfaces J1. The illumination light entering into the diffusing surface K is reflected irregularly and diffused in this diffusing surface K, and generates a substantial secondary light source here. That is, both of a component, directly entering into the diffusing surface K among the illumination light emitted from the light source 1, and another component, being reflected by the reflecting surfaces J1 and entering into the diffusing surface K, are used effectively, so that a secondary light source is thus generated.

In addition, the illumination light from this secondary light source emerges from the diffusing prism 12 through the exit surface A, while a part of the illumination light is reflected by the reflecting surfaces J2, and the illumination light transmits through the first polarizing plate 3 to enter into the illuminating prism 4. Hereafter, similarly to the first embodiment, the image light emerged from the display panel 5 reaches the observer's eye 8.

Thus, similarly to the first embodiment, a bright display image can be obtained in this embodiment without increasing the emitting amount in the light source 1, since a secondary light source is generated to illuminate the display panel 5 with effectively using the illumination light from the light source 1 in the diffusing prism 12.

Moreover, since the principal optical path of the illumination light from the light source 1 is bent by the diffusing surface (also serving as a reflecting surface) K of the diffusing prism 12, while being able to attain the miniaturization of the illumination optical system and also the whole apparatus, the allocation flexibility of the light source 1 can be also enhanced.

In addition, the reflecting surfaces J1 have a characteristic of making light with an incident angle, smaller than a total-reflection angle, transmit therethrough, and making light with an incident angle not smaller than the total-reflection angle reflect. Owing to this, the diffusing prism 12 can be miniaturized.

Moreover, in this embodiment, the first polarizing plate 3 is secured to the surface 41 of the illuminating prism 4, the second polarizing plate 6 is secured to the surface 42, and the panel 5 is secured to the surface 43. Hence, it is possible to perform positioning of those members to the prism lens 7 in one piece since the light source 1, the diffusing prism 12, and the illuminating prism 4 are secured in one piece through a supporting member not shown.

Embodiment 3

Figure 6:
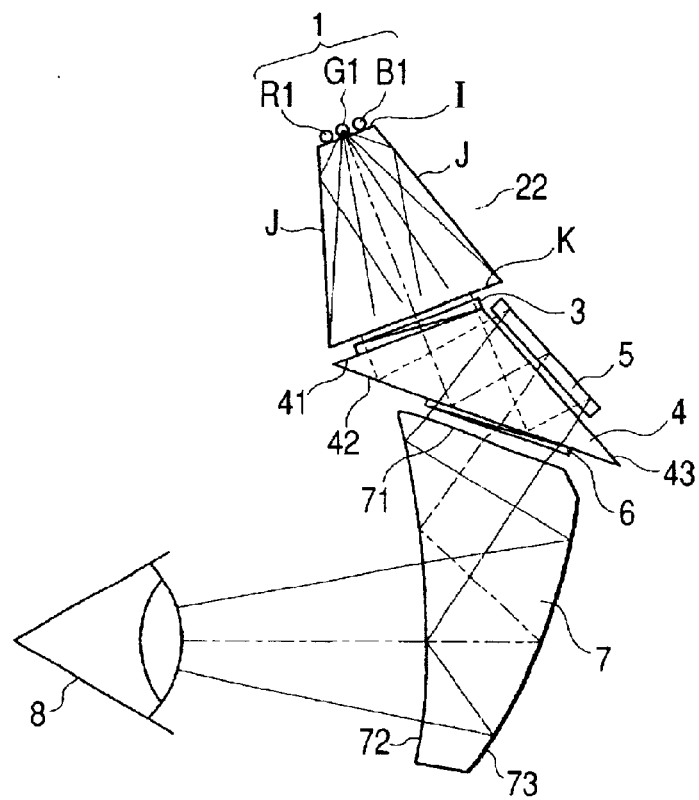
FIG. 6 is a structural diagram of an image display apparatus that is a third embodiment of the present invention.

FIG. 6 shows an image display apparatus that is a third embodiment of the present invention. In addition, the same reference numerals are assigned to components similar to those in the first and second embodiments.

In this embodiment, instead of the reflecting case 2 or diffusing prism 12 in the first or second embodiment, a light guide prism (a second light guide device) 22 is provided.

The light guide prism 22 is formed in a truncated-cone shape, and the incident surface I near which the light source 1 is disposed is formed in its top, the diffusion and exit surface K which is made to diffuse and emit the illumination light is formed in its soffit. Moreover, the inside surface of the light guide prism 22 is a reflecting surface J which reflects toward a diffusing and exit surface K a part of the illumination light which enters from the incident surface I.

In this embodiment, the divergent light (illumination light) emitted from the light source 1 enters into the light guide prism 22 through the incident surface I. The divergent light entering into the light guide prism 22 directly enters into the diffusing and exit surface K, or it is reflected by the reflecting surface J and enters into the diffusing and exit surface K. The illumination light entering into the diffusing and exit surface K is diffused in this diffusing and exit surface K, and generates a substantial secondary light source here. That is, a secondary light source is generated by effectively using both of a component of the illumination light emitted from the light source 1, which directly enters into the diffusing and exit surface K, and a component which is reflected by the reflecting surface J and enters into the diffusing and exit surface K.

In addition, the illumination light from this secondary light source emerges from the light guide prism 22, transmits through the first polarizing plate 3, and enters into the illuminating prism 4. Hereafter, the image light emerged from the display panel 5 like the first and second embodiments reaches the observer's eye 8.

Thus, in this embodiment, like the first and second embodiment, the illumination light from the light source 1 is effectively used by the light guide prism 22, a secondary light source is generated, and the illumination light illuminates the display panel 5. Hence, a bright display image can be obtained without increasing the emitting amount in the light source 1.

Figure 7:
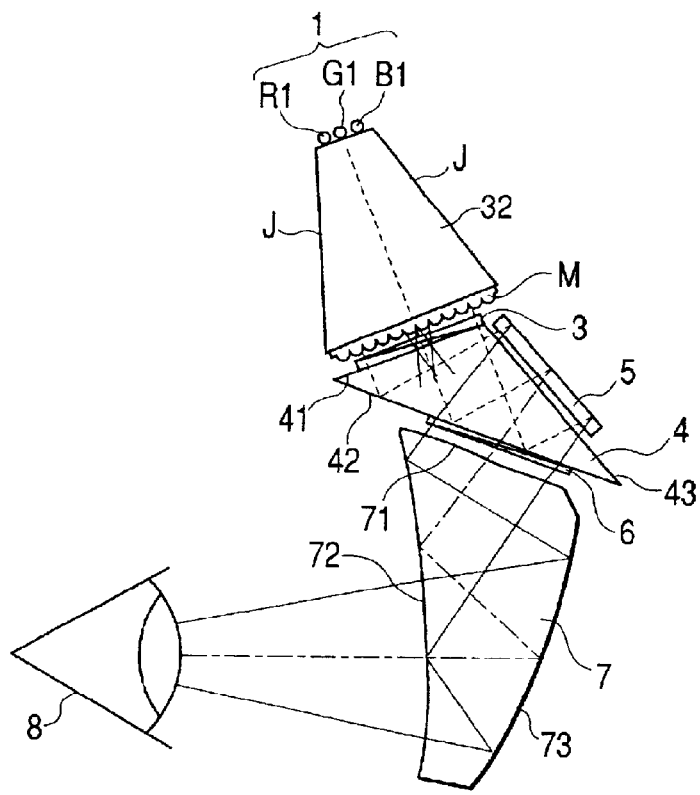
FIG. 7 is a structural diagram showing a modified example of the image display apparatus that is the third embodiment of the present invention.

In addition, although, in this embodiment, a case that the exit surface of the light guide prism 22 is made to be a diffusing surface is explained, as shown in FIG. 7, it can be also performed to generate a secondary micro light source unit by two-dimensionally arranging micro lens groups M on an exit surface.

Embodiment 4

Figure 8:
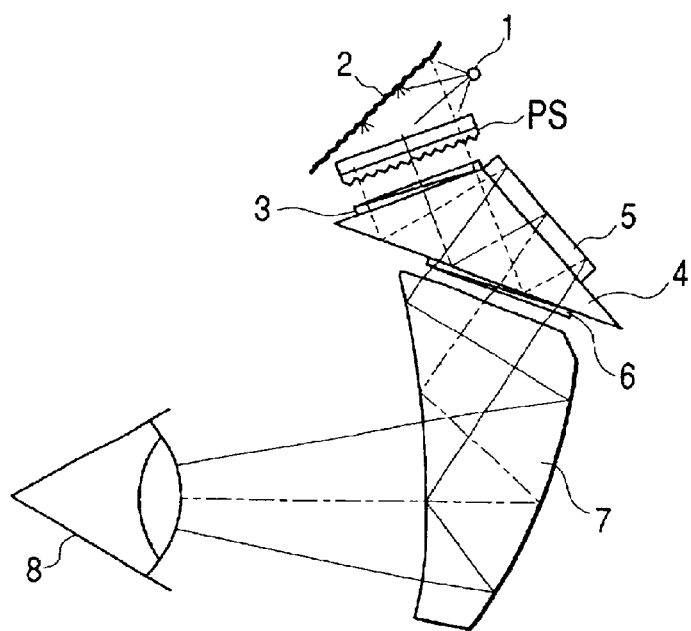
FIG. 8 is a structural diagram of an image display apparatus (a modified example of the first embodiment) that is the fourth embodiment of the present invention.
Figure 9:
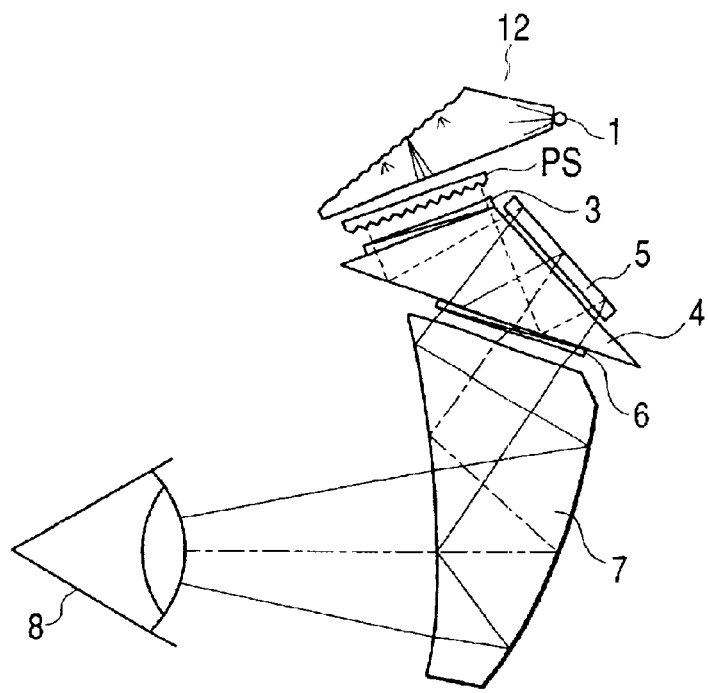
FIG. 9 is a structural diagram of an image display apparatus (a modified example of the second embodiment) that is the fourth embodiment of the present invention.
Figure 10:
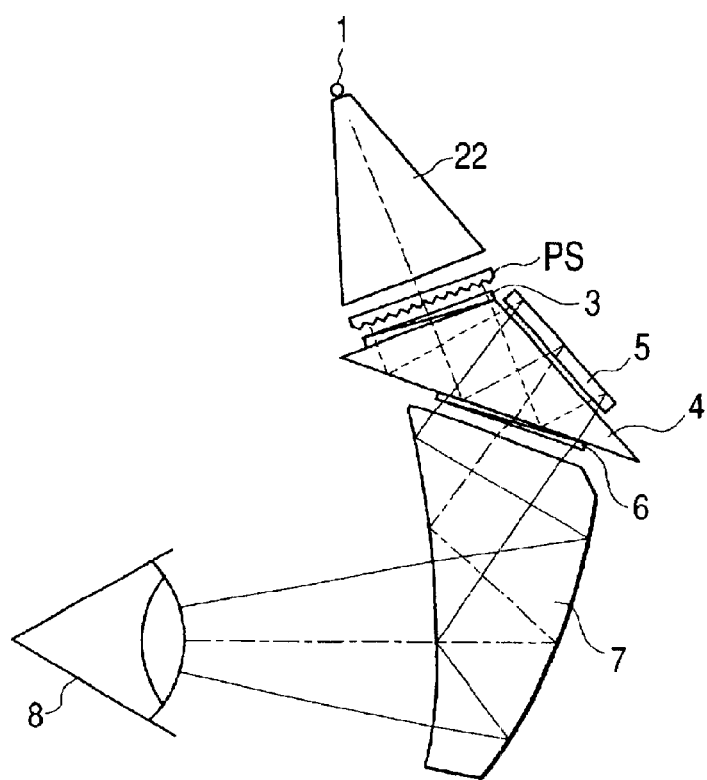
FIG. 10 is a structural diagram of an image display apparatus (a modified example of the third embodiment) that is the fourth embodiment of the present invention.

In the above-described first to third embodiments, a case is explained, the case that illumination light diffused by the reflecting case 2, the diffusing prism 12, or the light guide prism 22 is made to directly enter into the first polarizing plate 3 and is led to the illuminating prism 4. However, as shown in FIGS. 8 to 10, it can be performed to provide a prism plate (directional element) PS, where an exit surface is made to be sawtooth-shaped or concavo-convex, between the reflecting case 2, diffusing prism 12, or light guide prism 22, and the first polarizing plate 3.

Owing to this, since it is possible to make the diffused illumination light enter into the first polarizing plate 3 and also illuminating prism 4 with enhancing the directivity of the diffused illumination light, it is possible to efficiently illuminate the display panel 5.

Embodiment 5

Figures 11A, 11B:
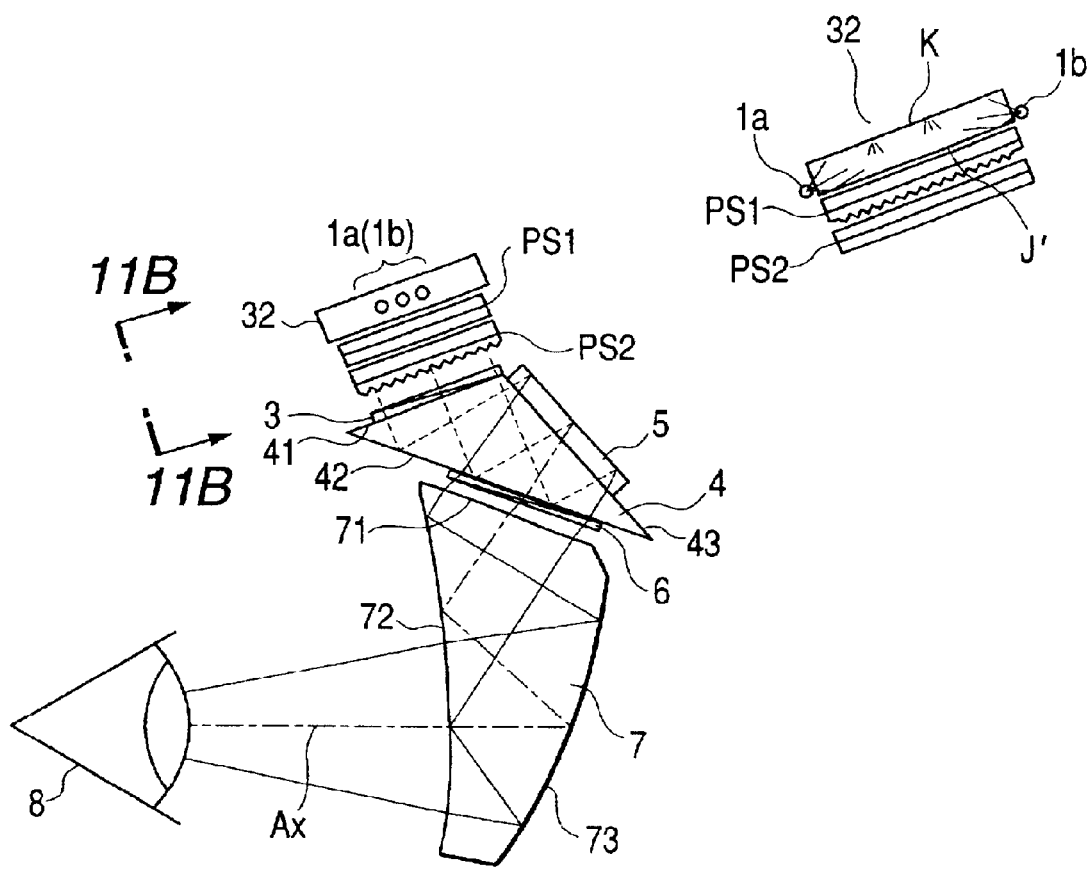
FIG. 11A is a structural diagram of an image display apparatus which is a fifth embodiment of the present invention.
FIG. 11B is a structural diagram taken in the direction of arrows 11B—11B.

FIG. 11A shows an image display apparatus which is a fifth embodiment of the present invention. FIG. 11B is a view taken in the direction of arrows 11B—11B. In addition, the same reference numerals are assigned to components similar to those in the above-described embodiments.

This embodiment is configured so that two sets of light sources (each has emitting parts of three colors, R, G, and B) 1a and 1b are arranged near two sides of an approximately plate-like diffusing prism plate 32, and hence illumination lights from light sources 1a and 1b is made to enter into the diffusing prism plate 32 from a direction perpendicular to a plane (drawing sheet) including a visual axis Ax inflected.

A top face of the diffusing prism plate 32 is configured as the diffusing surface K, and two sets of light sources 1a and 1b are arranged near an undersurface of the diffusing prism plate 32. For this reason, the divergent light (illumination light) from two sets of light sources 1a and 1b are directly incident on the diffusing surface K obliquely from the lower side (i.e. from the opposite side), or are reflected on a reflecting and transmitting surface J' which is the undersurface of the diffusing prism plate 32 and are incident on the diffusing surface K.

The illumination light incident on the diffusing surface K is reflected irregularly and diffused in this diffusing surface K, and generates a substantial secondary light source here. That is, a secondary light source is generated with effectively using both of a component, directly entering into the diffusing surface K among the illumination lights emitted from the light sources 1a and 1b, and another component, being reflected by the reflecting surface J' and entering into the diffusing surface K.

In addition, the illumination light from this secondary light source emerges from the reflecting and transmitting surface J' of the diffusing prism plate 32, transmits through the first polarizing plate 3, and enters into the illuminating prism 4. Hereafter, similarly to the above-described embodiments, the image light emerged from the display panel 5 reaches the observer's eye 8.

Thus, a bright display image can be also obtained in this embodiment without increasing the emitting amount in the light sources 1a and 1b, since a secondary light source is generated to illuminate the display panel 5 with effectively using the illumination lights from the light sources 1a and 1b in the diffusing prism plate 32.

Moreover, in this embodiment, the diffusing prism plate 32 is configured by stacking the prism plates (directional element) PS1 and PS2, whose exit surfaces each are sawtooth-shaped or concavo-convex, with changing the orientation by 90 degrees from each other.

Owing to this, since it is possible to make the diffused illumination light enter into the first polarizing plate 3 and also illuminating prism 4 with enhancing the directivity of the diffused illumination light in two directions, it is possible to efficiently illuminate the display panel 5.

In addition, although, in this embodiment, a case that two sets of light sources are used is explained, three or more sets of light sources can be used.

Moreover, although, in each of the above-described embodiments, a case that each light source having an emitting part of three colors, R, G, and B is used is explained, a white light source may be used for the light source and color filters may be provided for pixels of the display panel.

Numerical Embodiments

Next, the numeric data of an observation optical system used for the present invention will be expressed.

Figure 12:
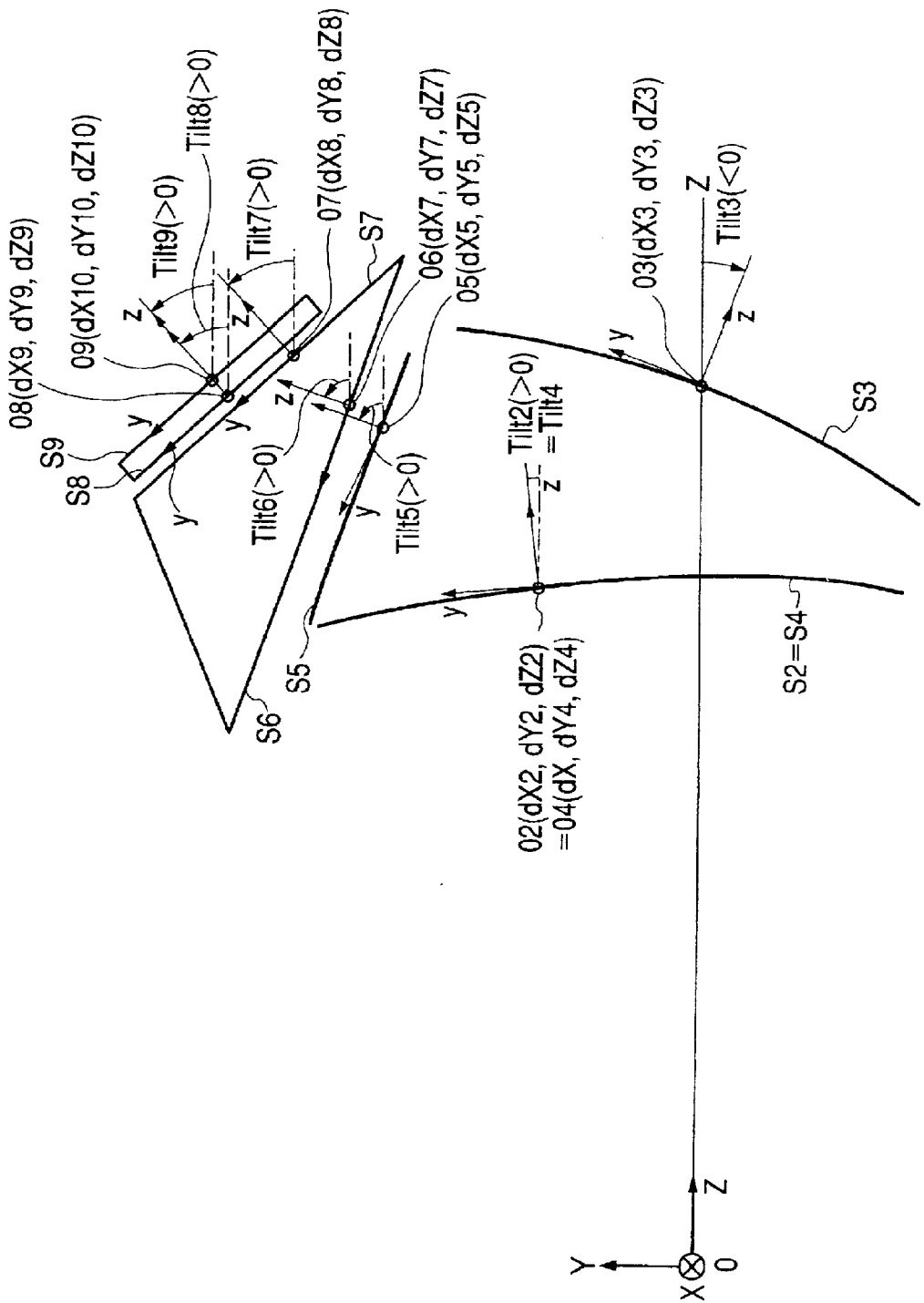
FIG. 12 is an explanatory view showing a coordinate system in numerical embodiments of the present invention.

Since the optical system in this embodiment is configured from decentered surfaces, so as to express a form of the optical system, as shown in FIG. 12, an absolute coordinate system (X, Y, Z) and a local coordinate system (x, y, z) are set.

An origin of the absolute coordinate system is set to the center O of an observer's desirable eye here, its Z-axis is set in the direction in which the point O is passed and an image center can be seen. Therefore, the Z-axis of the absolute coordinate system is a straight line that passes through the point O and is perpendicular to a pupil plane, and is on a symmetric plane (sheet of the drawing) of the optical system. The Y-axis is a straight line which makes the angle of 90° counterclockwise to the Z-axis through the origin O on the above-described symmetric plane. The X-axis is a straight line which passes through the origin O and intersects perpendicularly to the Y- and Z-axes.

As for the allocation of each surface, an origin $O_i$ of the local coordinates of each surface is set in the absolute coordinates ($dX_i$, $dY_i$, $dZ_i$). A shape of each surface is expressed as a function based on the local coordinates.

An angle $Tilt_i$ which the Z-axis of the absolute coordinate system and the z-axis of the local coordinates make is defined to be positive, when making a counterclockwise angle within the sheet of the drawing to the x-axis of the local coordinates, as shown in FIG. 12.

A shape of an optical surface in the numerical embodiments is a shape which has the aspherical surface expressed by the Zernike polynomials as a shape function showing a secondary curved surface, and hence each shape is expressed in the following function.

$$z = \frac{c(x^2 + y^2)}{1 + \{1 - c^2(x^2 + y^2)\}^{1/2}} + c4(x^2 - y^2) +$$
$$c5(-1 + 2x^2 + 2y^2) + c9(-2y + 3x^2 y + 3y^3) + c10(3x^2 y - y^3) +$$
$$c11(x^4 - 6x^2 y^2 + y^4) + c12(-3x^2 + 4x^4 + 3y^2 - 4y^4) +$$
$$c13(1 - 6x^2 + 6x^4 - 6y^2 + 12x^2 y^2 + 6y^4) +$$
$$c19(3y - 12x^2 y + 10x^4 y - 12y^3 + 20x^2 y^3 + 10y^5) +$$
$$c20(-12x^2 y + 15x^4 y + 4y^3 + 10x^2 y^3 - 5y^5) +$$
$$c21(5x^4 y - 10x^2 y^3 + y^5) + c22(x^6 - 15x^4 y^2 + 15x^2 y^4 - y^6) +$$
$$c23(6x^6 - 30x^4 y^2 - 30x^2 y^4 + 6y^6 - 5x^4 + 30x^2 y^2 - 5y^4) + c24($$
$$15x^6 + 15x^4 y^2 - 15x^2 y^4 - 15y^6 - 20x^4 + 20y^4 + 6x^2 - 6y^2) +$$
$$c25(20x^6 + 60x^4 y^2 + 60x^2 y^4 + 20y^6 - 30x^4 -$$
$$60x^2 y^2 - 30y^4 + 12x^2 + 12y^2 - 1)$$

Here, c is the curvature of each surface, and when r is let to be the basic radius of curvature of each surface, curvature c is $c = 1/r$. Moreover, $c_j$ is the aspherical surface coefficient of the Zernike polynomials in each surface.

In this embodiment, since the optical surface is symmetrical to YZ plane and the coefficient of each term which becomes asymmetric about the X-axis is 0, it is removed from the above formulas.

Moreover, lens data is set so that the origin O of the absolute-coordinates is a first surface S1 and an image display surface is an image plane, and is defined as an optical system where reverse-pursuit is performed for the propagation of actual light.

Numerical Embodiment 1

Image angle in x direction=±9.0°, Image angle in y direction=±12.0°

Prism refractive index (2nd–5th surfaces) n=1.571

| | | |
|---|---|---|
| S1 r: ∞ d: 31.03 n: 1.0000 | | |
| S2 dY 7.83 dZ 31.03 Tilt 3.50 | | | r: −100.433

| c4: −3.307e−03 | c5: −1.165e−03 | c9: −6.272e−05 |
|---|---|---|
| c10: −7.142e−05 | c11: 3.936e−07 | c12: 1.640e−06 |
| c13: −1.848e−06 | c19: −2.900e−08 | c20: 1.268e−08 |
| c21: −2.956e−07 | c22: 3.968e−09 | c23: −2.127e−09 |
| c24: 1.666e−09 | c25: −8.306e−10 | |

S3 dY 1.27 dZ 39.72 Tilt −21.50 r: −39.332

| c4: −1.389e−03 | c5: 1.135e−04 | c9: −8.011e−06 |
|---|---|---|
| c10: −5.002e−06 | c11: 2.126e−07 | c12: 5.227e−07 |
| c13: −4.186e−07 | c19: 2.591e−08 | c20: −2.986e−08 |
| c21: −2.274e−08 | c22: −8.657e−10 | c23: −5.791e−10 |
| c24: 5.953e−10 | c25: −5.290e−10 | |

S4 dY 7.83 dz 31.03 Tilt 3.50 r: −100.433

| c4: −3.307e−03 | c5: −1.165e−03 | c9: −6.272e−05 |
|---|---|---|
| c10: −7.142e−0 | c11: 3.936e−07 | c12: 1.640e−06 |
| c13: −1.848e−06 | c19: −2.900e−08 | c20: 1.268e−08 |
| c21: −2.956e−07 | c22: 3.968e−09 | c23: −2.127e−09 |
| c24: 1.666e−09 | c25: −8.306e−10 | |

S5 dY 14.79 dZ 38.10 Tilt 70.53 r: 37.866

| c4: 7.662e−03 | c5: 8.422e−04 | c9: −4.588e−04 |
|---|---|---|
| c10: 3.757e−04 | c11: 5.015e−05 | c12: 4.182e−06 |
| c13: 1.465e−05 | c19: −2.861e−07 | c20: 2.195e−07 |
| c21: −4.250e−06 | c22: −1.699e−07 | c23: −6.247e−08 |
| c24: −2.618e−08 | c25: −1.152e−10 | |

| | | |
|---|---|---|
| S6 dY 15.57 dZ 38.44 Tilt 71.34 | | |
| r: ∞ d: 3.50 n: 1.5163 | | |
| S7 dY 17.46 dZ 41.39 Tilt 38.53 | | |
| r: ∞ d: 0.10 n: 1.0000 | | |
| S8 dY 20.26 dZ 39.28 Tilt 38.53 | | |
| r: ∞ d: 1.10 n: 1.5230 | | |
| S9 r: ∞ d: 0.00 n: 1.0000 | | |

Numerical Embodiment 2

Image angle in x direction=±15.0°, Image angle in y direction=±11.2°

Prism refractive index (2nd–5th surfaces) n=1.570

| | | |
|---|---|---|
| S1 r: ∞ d: 36.95 n: 1.0000 | | |
| S2 dY −23.69 dZ 36.95 Tilt 10.49 | | | r: 255.629

| c4: 6.085e−04 | c5: −4.977e−04 | c9: 8.657e−06 |
|---|---|---|
| c10: −3.669e−05 | c11: 3.013e−07 | c12: −1.910e−07 |
| c13: −5.180e−08 | c19: −5.840e−10 | c20: −9.577e−10 |
| c21: −1.450e−09 | c22: −9.686e−11 | c23: −2.075e−11 |
| c24: 1.196e−11 | c25: −1.758e−11 | |

S3 dY −0.31 dZ 41.09 Tilt −22.91 r: −71.945

| c4: −2.459e−03 | c5: −1.110e−03 | c9: −5.627e−05 |
|---|---|---|
| c10: 9.527e−07 | c11: −7.886e−08 | c12: −5.893e−07 |
| c13: 1.109e−07 | c19: 8.032e−09 | c20: −1.540e−08 |
| c21: 1.105e−08 | c22: −6.381e−11 | c23: 1.914e−10 |
| c24: 5.234e−11 | c25: 9.073e−11 | |

S4 dY −23.69 dZ 36.95 Tilt 10.49 r: 255.629

| c4: 6.085e−04 | c5: −4.977e−04 | c9: 8.657e−06 |
|---|---|---|
| c10: −3.669e−05 | c11: 3.013e−07 | c12: −1.910e−07 |
| c13: −5.180e−08 | c19: −5.840e−10 | c20: −9.577e−10 |
| c21: −1.450e−09 | c22: −9.686e−11 | c23: −2.075e−11 |
| c24: 1.196e−11 | c25: −1.758e−11 | |

S5 dY 15.97 dZ 37.39 Tilt 52.17 r: −367.524

| c4: 1.211e−03 | c5: −3.804e−03 | c9: −8.203e−04 |
|---|---|---|
| c10: 7.935e−04 | c11: −3.264e−05 | c12: 1.544e−05 |
| c13: −1.167e−05 | c19: 0.000e+00 | c20: 0.000e+00 |
| c21: 0.000e+00 | c22: 0.000e+00 | c23: 0.000e+00 |
| C24: 0.000e+00 | C25: 0.000e+00 | |

| | | |
|---|---|---|
| S6 dY 19.02 dZ 36.97 Tilt 44.16 | | |
| r: ∞ d: 5.28 n: 1.5163 | | |
| S7 dY 21.58 dZ 41.87 Tilt 20.66 | | |
| r: ∞ d: 0.85 n: 1.0000 | | |
| S8 dY 18.16 dZ 43.37 Tilt 20.66 | | |
| r: ∞ d: 1.10 n: 1.5230 | | |
| S9 r: ∞ d: 0.00 n: 1.0000 | | |

Figure 13:
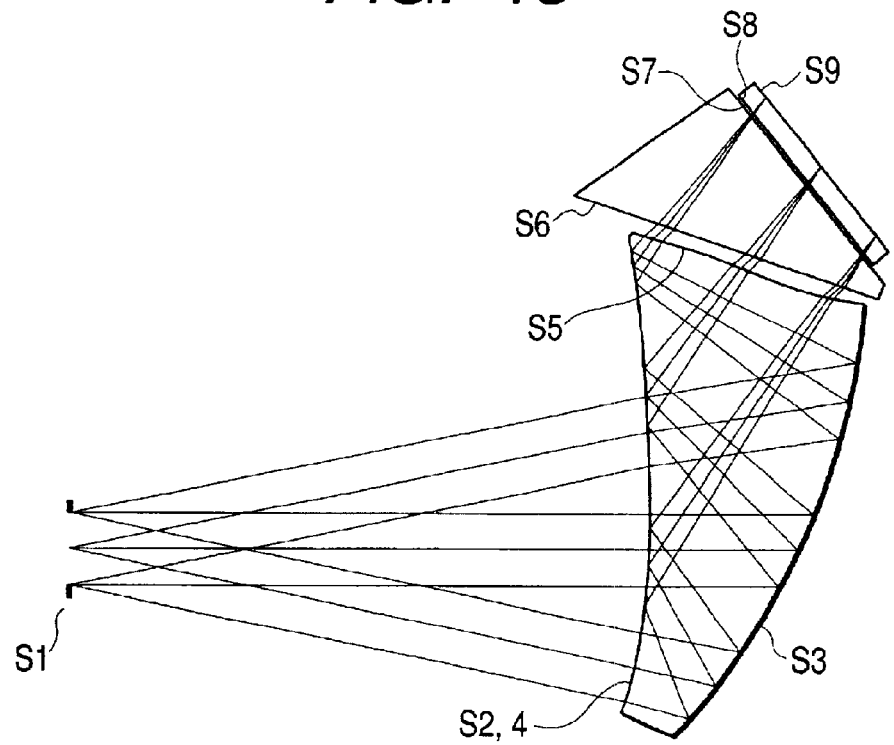
FIG. 13 is a cross-sectional view of an optical system in a numerical embodiment 1.
Figure 14:
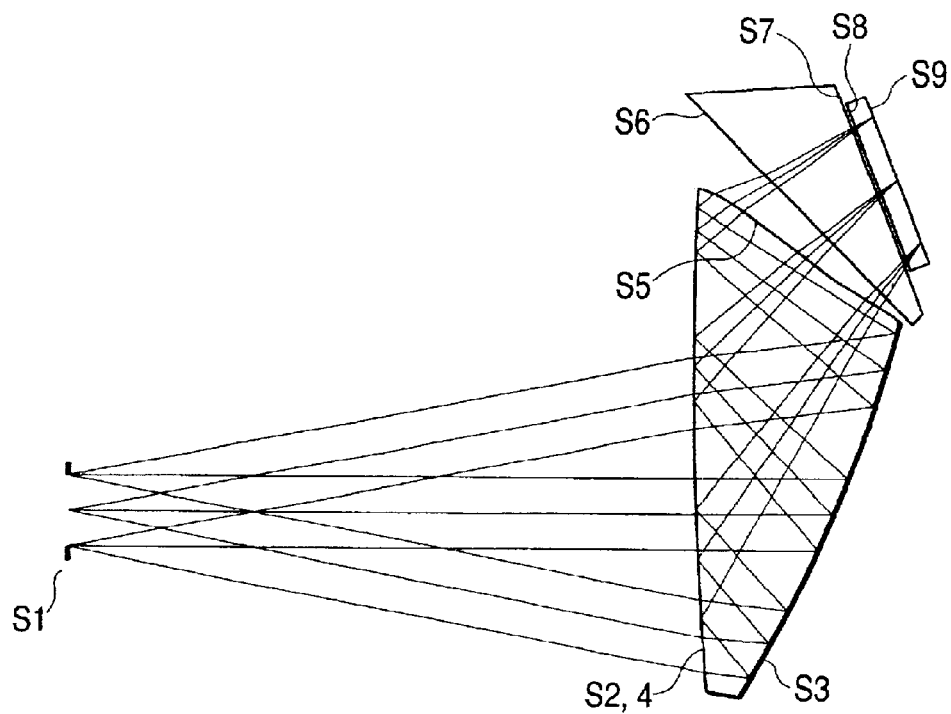
FIG. 14 is a cross-sectional view of an optical system in a numerical embodiment 2.
Figure 15:
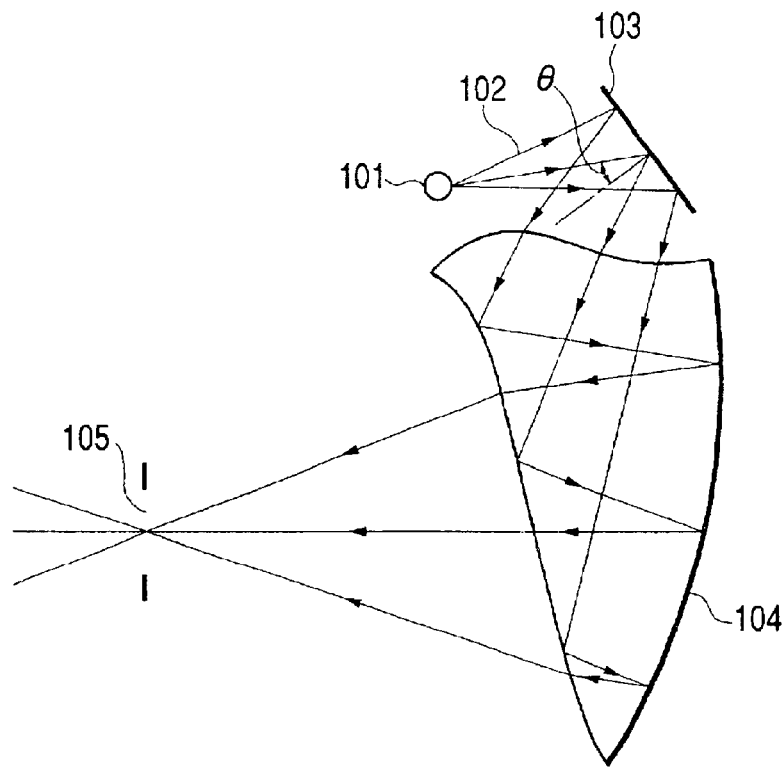
FIG. 15 is a structural diagram of a conventional image display apparatus.
Figure 16:
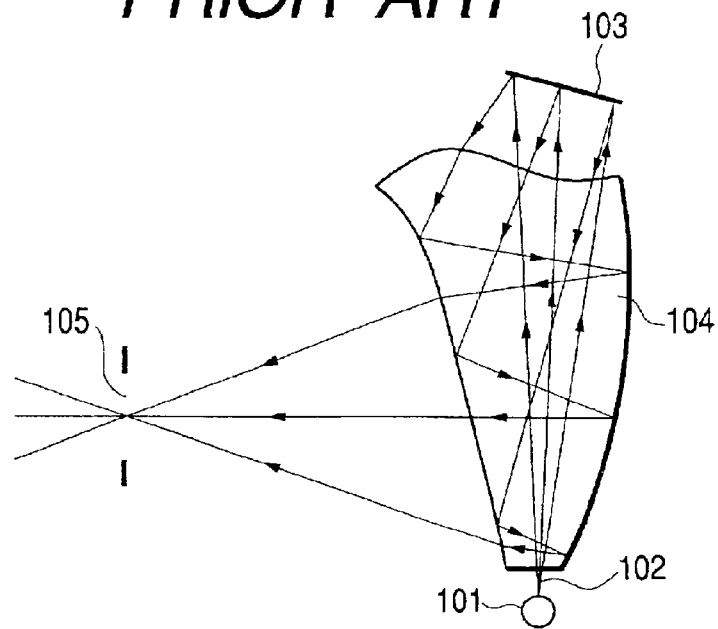
FIG. 16 is a structural diagram of another conventional image display apparatus.

FIGS. 13 and 14 are optical-path diagrams when optical paths are reverse-pursued from an eye side in the numerical embodiments 1 and 2, respectively. Each symbol in the figures expresses a symbol of each surface cited in numerical embodiments.

Here, since a direction where a field angle is wider is a horizontal direction when observing, a reflecting surface is configured in the numerical embodiment 1 so that a lateral direction to the observer becomes the Y direction, and the reflecting surface is configured in the numerical embodiment 2 so that vertical direction to the observer becomes the Y direction.

As explained above, according to this embodiment, a secondary light source is generated by using both of an illumination-light component which enters directly to a secondary light source generating surface provided in a second light guide device among the illumination light from a light source, and another illumination light component led to the secondary light source generating surface by the reflection on a reflecting surface similarly provided in the second light guide device. Furthermore, a reflective image display device is illuminated by making the illumination light from this secondary light source enter into the first light guide device. Hence, a bright display image can be obtained without increasing the emitting amount in the light source since it is possible to effectively use the illumination light from the light source.

In addition, if a directional element providing an action of enhancing the directivity of the illumination light which emerges from the second light guide device (that is, light being diffused and so on in the secondary light source generating surface to emerge there from) and enters into the first light guide device is provided, it is possible to more efficiently illuminate the reflective image display device.

Moreover, the principal optical path of the illumination light is bent by the reflecting surfaces of the second light guide device and it is made to lead the illumination light to the first light guide device. Hence, in comparison with a case that the principal optical path of the illumination light from a light source is not bent and a lens system for the formation of parallel light from the illumination light or condensing the illumination light is disposed between the light source and first light guide device, the illumination optical system and also whole apparatus can be made more compactly, and the allocation flexibility of the light source can be enhanced.

Moreover, if a device having a reflecting and transmitting surface which reflects incident illumination light toward a reflective image display device and transmits image light from the reflective image display device toward the projection optical element is used as a first light guide device, it is possible to miniaturize an illumination optical system since at least parts of an area where the illumination light passes and an area where the image light passes overlap in the first light guide device.

Moreover, it is possible to favorably correct the distortion of an image by making at least one of the optical surfaces (reflecting surfaces are included), provided in a projection optical element, to be a rotationally asymmetrical surface.

Furthermore, if a second polarizing plate which analyzes the image light from the reflective image display device is provided between the reflecting and transmitting surface of the first light guide device and the projection optical element while providing the first polarizing plate for making illumination light, emitted from the second light guide device, enter into the first light guide device as polarized light, it is possible to display a better image by separately controlling polarization conditions of the illumination light and image light.

Moreover, a plurality of light emitting portions for emitting respective different colors of the illumination light are provided as a light source when a color image is displayed, while sequentially switching the emitting time of the light from these plurality of emitting portions, a reflective image display device is made to perform the time-sequential display of images according to colors of the illumination light with synchronizing with the timing of emission switching of the plurality of above-described emitting portions. Then, it becomes possible to perform high-resolution image display without pixel discrepancy by color.

What is claimed is:

1. An image display apparatus comprising:
   a light source for supplying illumination light;
   a reflection type display device which reflects the illumination light and modulates the illumination light into image light;
   an illumination optical system for guiding the illumination light to the reflection type display device, wherein the illumination optical system comprises:
   a) a first optical member for directing the illumination light toward the reflection type display device; and
   b) a second optical member including:
      i) a part generating a secondary light source with the illumination light emitted from said light source, in which the light from the part emerges toward said first optical member; and
      ii) a reflecting surface which guides illumination light which is not incident directly on the part to the part; and
   an eyepiece optical system for guiding the image light to an observer.

2. An image display apparatus according to claim 1, wherein said first optical member comprises a first surface on which the illumination light from said part is incident, a second surface which totally reflects the light incident from the first surface, and a third surface from which the light totally reflected by the second surface emerges toward said reflection type display device; and
   the image light modulated by said reflection type display device again enters into said first optical member from the third surface, and emerges toward said projection optical system from the second surface.

3. An image display apparatus according to claim 1, wherein said part is a diffusing surface.

4. An image display apparatus according to claim 1, wherein said part is a reflecting and diffusing surface.

5. An image display apparatus according to claim 1, wherein said part is a microlens group.

6. An image display apparatus according to claim 1, further comprising a directional element that is arranged between said first optical member and said second optical member, and enhances directivity of illumination light that emerges from said second optical member and enters into said first optical member.

7. An image display apparatus according to claim 1, further comprising:
   a reflecting-liquid-crystal display device as said reflection type display device; and
   a polarizing member capable of polarizing the illumination light and analyzing the image light,
   wherein said polarizing member is arranged in a position where a condition, I1/IO<0.1 is satisfied with letting optical intensity of outdoor daylight entering from an observer side to said projection optical system on said reflective-liquid-crystal display device be IO and letting optical intensity on said polarizing member be I1.

8. An image display apparatus according to claim 1, further comprising:
   a reflective-liquid-crystal display device as said reflection type display device;
   a first polarizing member which converts illumination light emerged from said second optical member into S-polarized light to be incident on said first optical member; and
   a second polarizing member for analyzing the image light modulated by said reflective-liquid-crystal display device into P-polarized light.

9. An image display apparatus according to claim 1, wherein said projection optical system comprises an optical element having a plurality of optical surfaces; and
   at least one among the plurality of said optical surfaces is a reflecting surface and at least one is a rotationally asymmetrical surface.

10. An image display apparatus comprising:
    light source for supplying illumination light;
    a reflection type display device which reflects the illumination light and modulates the illumination light into image light; and
    an illumination optical system for guiding the illumination light to said reflection type display device, wherein the illumination optical system comprises:
    a first optical member for directing the illumination light toward said reflection type display device; and
    a second optical member including a first reflecting surface which deflects a principal optical path of the illumination light from said light source and emitting the illumination light, reflected by said first reflecting surface, toward said first optical member, and a second reflecting surface which guides illumination light which is not incident directly on said first reflecting surface; and an eyepiece optical system for guiding the image light to an observer.

11. An image display apparatus according to claim 10, wherein said first optical member comprises a first surface on which the illumination light is incident, a second surface which totally reflects the light incident from the first surface, and a third surface from which the light totally reflected by the second surface emerges toward said reflection type display device; and the image light modulated by said reflection type display device again enters into said first optical member from the third surface, and emerges toward said projection optical system from the second surface.

12. An image display apparatus according to claim 10, wherein the reflecting surface of said second optical member generates a secondary light source with the illumination light emitted from said light source.

13. An image display apparatus according to claim 12, wherein said second optical member guides illumination light which is not incident directly on the reflecting surface to the reflecting surface.

14. An image display apparatus according to claim 10, further comprising a directional element that is disposed between said first optical member and said second optical member, and enhances directivity of illumination light emerged from said second optical member and entering into the said first optical member.

15. An image display apparatus according to claim 10, further comprising:

a reflective-liquid-crystal display device as said reflection type display device; and a polarizing member capable of polarizing the illumination light and analyzing the image light, wherein said polarizing member is arranged in a position where a condition, I1/IO<0.1 is satisfied with letting optical intensity of outdoor daylight entering from an observer side to said projection optical system on said reflective-liquid-crystal display device be IO and letting optical intensity on said polarizing member be I1.

16. An image display apparatus according to claim 10, further comprising:

a reflective-liquid-crystal display device as said reflection type display device;

a first polarizing member which converts the illumination light emerged from said second optical member into S-polarized light to be incident on said first optical member; and a second polarizing member for analyzing the image light modulated by said reflective-liquid-crystal display device into P-polarized light.

17. An image display apparatus according to claim 10, wherein said projection optical system comprises an optical element having a plurality of optical surfaces, and at least one among the plurality of said optical surfaces is a reflecting surface and at least one is a rotationally asymmetrical surface.

18. An image display apparatus comprising:

the image display apparatus according to any one of claims 1 or 10; and an image information output apparatus for supplying image information to said image display apparatus.

19. An optical system comprising:

an illumination optical system for guiding illumination light to a reflection type display device, wherein said illumination optical system comprises:

a) a first optical member for directing the illumination light toward the reflection type display device; and b) a second optical member including:

i) a part which generates a secondary light source with the illumination light emitted from a light source, in which the light from said part emerges toward said first optical member; and ii) a reflecting surface which guides illumination light which is not incident directly on the part to the part; and an eyepiece optical system for guiding the image light, reflected by said reflection type display device, to an observer.

20. An optical system comprising:

an illumination optical system for guiding illumination light to a reflection type display device, wherein said illumination optical system comprises:

a first optical member for directing the illumination light toward the reflection type display device; and a second optical member that includes a first reflecting surface which deflects a principal optical path of illumination light from a light source and emits the illumination light, reflected by the first reflecting surface, toward said first optical member, and a second reflecting surface which guides illumination light which is not incident directly on the first reflecting surface; and an eyepiece optical system for guiding image light, reflected by the reflection type display device, to an observer.

* * * * *

UNITED STATES PATENT AND TRADEMARK OFFICE
CERTIFICATE OF CORRECTION

PATENT NO. : 6,814,442 B2
DATED : November 9, 2004
INVENTOR(S) : Atsushi Okuyama et al.

It is certified that error appears in the above-identified patent and that said Letters Patent is hereby corrected as shown below:

Title page,
Item [56], References Ctied, U.S. PATENT DOCUMENTS, "5,640,632 A 6/1997 Koyama et al." should read -- 5,640,632 A 7/1997 Koyama et al. --.

Column 14,
Line 50, "light" should read -- a light --.

Signed and Sealed this

Twentieth Day of September, 2005

JON W. DUDAS
*Director of the United States Patent and Trademark Office*